United States Patent
Blum

(10) Patent No.: US 11,852,914 B2
(45) Date of Patent: *Dec. 26, 2023

(54) SWITCHABLE MICRO-LENS ARRAY FOR AUGMENTED REALITY AND MIXED REALITY

(71) Applicant: e-Vision Smart Optics, Inc., Sarasota, FL (US)

(72) Inventor: Ronald Blum, Roanoke, VA (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/404,253

(22) Filed: Aug. 17, 2021

(65) Prior Publication Data

US 2022/0171235 A1 Jun. 2, 2022

Related U.S. Application Data

(63) Continuation of application No. 16/521,527, filed on Jul. 24, 2019, now Pat. No. 11,119,353, which is a continuation-in-part of application No. 16/449,395, filed on Jun. 22, 2019, now Pat. No. 10,634,921, which is a continuation-in-part of application No. 16/289,623, filed on Feb. 28, 2019, now Pat. No. 10,634,912, which is a continuation-in-part of
(Continued)

(51) Int. Cl.
*G02F 1/1335* (2006.01)
*G06T 19/00* (2011.01)

(52) U.S. Cl.
CPC ...... *G02F 1/133526* (2013.01); *G06T 19/006* (2013.01)

(58) Field of Classification Search
CPC .................................................. G06T 19/006
See application file for complete search history.

(56) References Cited

U.S. PATENT DOCUMENTS 5,499,138 A    3/1996  Iba
6,349,001 B1   2/2002  Spitzer
(Continued)

FOREIGN PATENT DOCUMENTS

AU    2014400408 B2    11/2018
EP    1300716 A1       4/2003
(Continued)

OTHER PUBLICATIONS

Commander et al., "Microlenses immersed in nematic liquid crystal with electrically controllable focal length," in Third European Optical Society 'Microlens Arrays' Topical Meeting, 1995, 7 pages.
(Continued)

*Primary Examiner* — Charles Tseng
(74) *Attorney, Agent, or Firm* — Smith Baluch LLP

(57) ABSTRACT

A see-through near eye display, which can be modulated in such a manner to synchronize with electronic enabled micro-lenses of a switchable micro-lens array, wherein when pixels of the near eye display are lit the micro-lenses of the micro-lens array are present; thus, a virtual image can be formed and seen by the eye of a user. When the see-through near eye display is not lit, the micro-lenses are not present, thus permitting a real image to be present.

9 Claims, 3 Drawing Sheets

Related U.S. Application Data application No. 16/008,707, filed on Jun. 14, 2018, now Pat. No. 10,466,487, which is a continuation-in-part of application No. 15/994,595, filed on May 31, 2018, now Pat. No. 10,884,246.

(60) Provisional application No. 62/848,636, filed on May 16, 2019, provisional application No. 62/847,427, filed on May 14, 2019, provisional application No. 62/830,645, filed on Apr. 8, 2019, provisional application No. 62/796,388, filed on Jan. 24, 2019, provisional application No. 62/796,410, filed on Jan. 24, 2019, provisional application No. 62/794,779, filed on Jan. 21, 2019, provisional application No. 62/793,166, filed on Jan. 16, 2019, provisional application No. 62/790,514, filed on Jan. 10, 2019, provisional application No. 62/790,516, filed on Jan. 10, 2019, provisional application No. 62/788,993, filed on Jan. 7, 2019, provisional application No. 62/788,995, filed on Jan. 7, 2019, provisional application No. 62/788,275, filed on Jan. 4, 2019, provisional application No. 62/787,834, filed on Jan. 3, 2019, provisional application No. 62/785,284, filed on Dec. 27, 2018, provisional application No. 62/783,603, filed on Dec. 21, 2018, provisional application No. 62/783,596, filed on Dec. 21, 2018, provisional application No. 62/780,396, filed on Dec. 17, 2018, provisional application No. 62/780,391, filed on Dec. 17, 2018, provisional application No. 62/778,960, filed on Dec. 13, 2018, provisional application No. 62/778,972, filed on Dec. 13, 2018, provisional application No. 62/775,945, filed on Dec. 6, 2018, provisional application No. 62/774,362, filed on Dec. 3, 2018, provisional application No. 62/771,204, filed on Nov. 26, 2018, provisional application No. 62/770,210, filed on Nov. 21, 2018, provisional application No. 62/769,883, filed on Nov. 20, 2018, provisional application No. 62/756,542, filed on Nov. 6, 2018, provisional application No. 62/756,528, filed on Nov. 6, 2018, provisional application No. 62/755,626, filed on Nov. 5, 2018, provisional application No. 62/755,630, filed on Nov. 5, 2018, provisional application No. 62/754,929, filed on Nov. 2, 2018, provisional application No. 62/753,583, filed on Oct. 31, 2018, provisional application No. 62/752,739, filed on Oct. 30, 2018, provisional application No. 62/739,907, filed on Oct. 2, 2018, provisional application No. 62/739,904, filed on Oct. 2, 2018, provisional application No. 62/732,138, filed on Sep. 17, 2018, provisional application No. 62/732,039, filed on Sep. 17, 2018, provisional application No. 62/728,251, filed on Sep. 7, 2018, provisional application No. 62/720,116, filed on Aug. 21, 2018, provisional application No. 62/720,113, filed on Aug. 20, 2018, provisional application No. 62/717,424, filed on Aug. 10, 2018, provisional application No. 62/711,669, filed on Jul. 30, 2018, provisional application No. 62/703,909, filed on Jul. 27, 2018, provisional application No. 62/703,911, filed on Jul. 27, 2018, provisional application No. 62/700,621, filed on Jul. 19, 2018, provisional application No. 62/700,632, filed on Jul. 19, 2018, provisional application No. 62/694,222, filed on Jul. 5, 2018, provisional application No. 62/648,371, filed on Mar. 26, 2018, provisional application No. 62/638,789, filed on Mar. 5, 2018, provisional application No. 62/626,660, filed on Feb. 5, 2018, provisional application No. 62/624,201, filed on Jan. 31, 2018, provisional application No. 62/619,752, filed on Jan. 20, 2018, provisional application No. 62/613,313, filed on Jan. 3, 2018, provisional application No. 62/607,582, filed on Dec. 19, 2017, provisional application No. 62/546,473, filed on Aug. 16, 2017, provisional application No. 62/542,168, filed on Aug. 7, 2017, provisional application No. 62/530,638, filed on Jul. 10, 2017, provisional application No. 62/522,866, filed on Jun. 21, 2017, provisional application No. 62/513,828, filed on Jun. 1, 2017.

(56) References Cited

U.S. PATENT DOCUMENTS

| | | |
|---|---|---|
| 6,356,392 B1 | 3/2002 | Spitzer |
| 6,376,819 B1 | 4/2002 | Neal et al. |
| 6,945,648 B2 | 9/2005 | Schindler et al. |
| 7,192,136 B2 | 3/2007 | Howell et al. |
| 7,195,353 B2 | 3/2007 | Blum et al. |
| 7,318,646 B2 | 1/2008 | Bernard et al. |
| 7,663,805 B2 | 2/2010 | Zaloum et al. |
| 7,667,783 B2 | 2/2010 | Hong et al. |
| 7,791,809 B2 | 9/2010 | Filipovich et al. |
| 8,177,361 B2 | 5/2012 | Sessner et al. |
| 8,508,830 B1 | 8/2013 | Wang |
| 8,847,851 B2 | 9/2014 | Yamamoto |
| 8,970,962 B2 | 3/2015 | Filipovich et al. |
| 9,164,284 B2 | 10/2015 | Olsson et al. |
| 9,189,829 B2 | 11/2015 | Komori et al. |
| 9,285,592 B2 | 3/2016 | Olsson et al. |
| 9,507,153 B2 | 11/2016 | Filipovich et al. |
| 9,551,872 B1 | 1/2017 | Kress et al. |
| 9,552,676 B2 | 1/2017 | Wong et al. |
| 9,557,152 B2 | 1/2017 | Starner et al. |
| 9,584,705 B2 | 2/2017 | Nordstrom et al. |
| 9,710,058 B2 | 7/2017 | Gustafsson et al. |
| 9,720,257 B2 | 8/2017 | Han et al. |
| 9,753,287 B2 | 9/2017 | Chow et al. |
| 9,759,917 B2 | 9/2017 | Osterhout et al. |
| 9,766,482 B2 | 9/2017 | Cazalet et al. |
| D800,118 S | 10/2017 | Xing et al. |
| 9,977,245 B2 | 5/2018 | Mack et al. |
| 9,983,408 B2 | 5/2018 | Vieira |
| 9,989,765 B2 | 6/2018 | Jepsen |
| 10,162,182 B2 | 12/2018 | Jepsen |
| 10,330,933 B2 | 6/2019 | Jang et al. |
| 11,119,353 B2 | 9/2021 | Blum |
| 2002/0075202 A1* | 6/2002 | Fergason .............. H04N 9/3167 348/E5.145 |
| 2006/0082768 A1 | 4/2006 | Wilson et al. |
| 2006/0250574 A1 | 11/2006 | Grand et al. |
| 2007/0215793 A1 | 9/2007 | Gruhlke et al. |
| 2009/0046143 A1* | 2/2009 | Hiddink ............... H04N 13/317 348/E13.044 |
| 2009/0231722 A1 | 9/2009 | Filipovich et al. |
| 2010/0002217 A1* | 1/2010 | Fiolka .................. G02B 27/283 362/19 |
| 2010/0164840 A1 | 7/2010 | Yamamoto |
| 2010/0315720 A1 | 12/2010 | Filipovich et al. |
| 2012/0206452 A1 | 8/2012 | Geisner et al. |
| 2013/0021226 A1 | 1/2013 | Bell |
| 2013/0044042 A1 | 2/2013 | Olsson et al. |
| 2013/0099091 A1 | 4/2013 | Nemirovsky et al. |
| 2013/0208175 A1 | 8/2013 | Ono |
| 2013/0234935 A1 | 9/2013 | Griffith |
| 2014/0022163 A1 | 1/2014 | Olsson et al. |
| 2014/0062865 A1 | 3/2014 | Fateh |
| 2014/0118829 A1 | 5/2014 | Ma et al. |
| 2014/0168034 A1 | 6/2014 | Luebke et al. |
| 2014/0168783 A1 | 6/2014 | Luebke et al. |
| 2014/0267723 A1 | 9/2014 | Davidson et al. |

(56) References Cited

U.S. PATENT DOCUMENTS

| | | |
|---|---|---|
| 2014/0276686 A1 | 9/2014 | Wu et al. |
| 2014/0327971 A1 | 11/2014 | Filpovich et al. |
| 2015/0168730 A1 | 6/2015 | Ashkenazi et al. |
| 2015/0169070 A1 | 6/2015 | Harp et al. |
| 2015/0205132 A1 | 7/2015 | Osterhout et al. |
| 2015/0235445 A1 | 8/2015 | Schowengerdt |
| 2015/0268415 A1 | 9/2015 | Schowengerdt et al. |
| 2015/0277123 A1 | 10/2015 | Chaum et al. |
| 2015/0293358 A1 | 10/2015 | Vieira et al. |
| 2015/0357315 A1 | 12/2015 | Oraw |
| 2016/0048018 A1 | 2/2016 | Vieira |
| 2016/0252728 A1 | 9/2016 | Mack et al. |
| 2016/0327798 A1 | 11/2016 | Xiao |
| 2016/0337625 A1 | 11/2016 | Nakamura |
| 2017/0028299 A1 | 2/2017 | The et al. |
| 2017/0031435 A1 | 2/2017 | Raffle et al. |
| 2017/0038590 A1 | 2/2017 | Jepsen |
| 2017/0039960 A1 | 2/2017 | Jepsen |
| 2017/0052802 A1 | 2/2017 | Ko et al. |
| 2017/0090557 A1 | 3/2017 | Raffle et al. |
| 2017/0122725 A1 | 5/2017 | Yeoh et al. |
| 2017/0140701 A1 | 5/2017 | Ogonowsky |
| 2017/0147034 A1 | 5/2017 | Lanman et al. |
| 2017/0153454 A1 | 6/2017 | Callier et al. |
| 2017/0176777 A1 | 6/2017 | Blum et al. |
| 2017/0200296 A1 | 7/2017 | Jones et al. |
| 2017/0227779 A1 | 8/2017 | Kato et al. |
| 2017/0229095 A1 | 8/2017 | Raffle et al. |
| 2017/0235161 A1 | 8/2017 | Hilkes et al. |
| 2017/0243371 A1 | 8/2017 | Jurgenson et al. |
| 2017/0249862 A1 | 8/2017 | Border |
| 2017/0256029 A1 | 9/2017 | Shams et al. |
| 2017/0270637 A1 * | 9/2017 | Perreault ............ H04N 5/23232 |
| 2017/0276963 A1 | 9/2017 | Brennan et al. |
| 2017/0285347 A1 | 10/2017 | Cai et al. |
| 2017/0336634 A1 | 11/2017 | Mack et al. |
| 2018/0024366 A1 | 1/2018 | Ma et al. |
| 2018/0045964 A1 | 2/2018 | Jones et al. |
| 2018/0130226 A1 | 5/2018 | Meess et al. |
| 2018/0348529 A1 | 12/2018 | Blum et al. |
| 2019/0057957 A1 | 2/2019 | Xie |
| 2019/0094803 A1 | 3/2019 | Futterer |
| 2019/0310481 A1 | 10/2019 | Blum et al. |

FOREIGN PATENT DOCUMENTS

| | | | |
|---|---|---|---|
| EP | 1590699 B1 * | 11/2006 | ......... G02B 27/2214 |
| FR | 2842591 B1 | 10/2004 | |
| FR | 20020008969 B1 | 10/2004 | |
| JP | 2006251329 A | 9/2006 | |
| JP | 2017212475 A | 11/2017 | |
| WO | 2008084751 A1 | 7/2008 | |
| WO | 2010105201 A1 | 9/2010 | |
| WO | 2013025672 A2 | 2/2013 | |
| WO | 2013036888 A2 | 3/2013 | |
| WO | 2013025672 A3 | 5/2013 | |
| WO | 2016004998 A1 | 1/2016 | |
| WO | 2016135727 A1 | 9/2016 | |
| WO | 2017151872 A1 | 9/2017 | |
| WO | 2017169345 A1 | 10/2017 | |
| WO | 2017171157 A1 | 10/2017 | |
| WO | 2018217253 A1 | 11/2018 | |

OTHER PUBLICATIONS

Co-Pending International Application No. PCT/US2018/035424 filed May 31, 2018, Search Report and Written Opinion of the International Searching Authority, dated Aug. 31, 2018, 16 pages.
Co-Pending International Application No. PCT/US2018/037561 filed Jun. 14, 2018, Search Report and Written Opinion of the International Searching Authority, dated Sep. 21, 2018, 13 pages.
Co-Pending International Application No. PCT/US2019/020168 filed Feb. 28, 2019, Search Report and Written Opinion of the International Searching Authority, dated May 23, 2019, 15 pages.
Fan et al., "Liquid Crystal Microlens Arrays With Switchable Positive and Negative Focal Lengths," Journal of Display Technology, pp. 151-156, Aug. 22, 2005, IEEE.
Ren, Hongwen, Tunable micro-lens arrays using polymer network liquid crystal, Optical Communication, vol. 230 (2004), pp. 267-271.
Villa et al., "CMOS imager with 1024 SPADs and TDCs for single-photon timing and 3-D time-of-flight." IEEE Journal of Selected Topics in Quantum Electronics 20.6 (2014): 364-373.

* cited by examiner

Micro-Lens Array

SWITCHABLE MICRO-LENS ARRAY FOR AUGMENTED REALITY AND MIXED REALITY

CROSS-REFERENCE TO RELATED APPLICATIONS

The present application is a continuation of U.S. application Ser. No. 16/521,527, filed on Jul. 24, 2019, which is a continuation-in-part of U.S. application Ser. No. 16/449,395, filed on Jun. 22, 2019, which claims priority from: U.S. Application 62/848,636, filed May 16, 2019; U.S. Application No. 62/847,427, filed May 14, 2019; and U.S. Application No. 62/830,645, filed Apr. 8, 2019.

U.S. application Ser. No. 16/521,527 is also a continuation-in-part of U.S. application Ser. No. 16/289,623 filed Feb. 28, 2019, which claims priority from: U.S. Application No. 62/796,388 filed Jan. 24, 2019; U.S. Application No. 62/796,410, filed Jan. 24, 2019; U.S. Application No. 62/794,779, filed Jan. 21, 2019; U.S. Application No. 62/793,166, filed Jan. 16, 2019; U.S. Application No. 62/790,514, filed Jan. 10, 2019; U.S. Application No. 62/790,516, filed Jan. 10, 2019; U.S. Application No. 62/788,993, filed Jan. 7, 2019; U.S. Application No. 62/788,995, filed Jan. 7, 2019; U.S. Application No. 62/788,275, filed Jan. 4, 2019; U.S. Application No. 62/787,834, filed Jan. 3, 2019; U.S. Application No. 62/785,284, filed Dec. 27, 2018; U.S. Application No. 62/783,596, filed Dec. 21, 2018; U.S. Application No. 62/783,603, filed Dec. 21, 2018; U.S. Application No. 62/780,391, filed Dec. 17, 2018; U.S. Application No. 62/780,396, filed Dec. 17, 2018; U.S. Application No. 62/778,960, filed Dec. 13, 2018; U.S. Application No. 62/778,972, filed Dec. 13, 2018; U.S. Application No. 62/775,945, filed Dec. 6, 2018; U.S. Application No. 62/774,362, filed Dec. 3, 2018; U.S. Application No. 62/771,204, filed Nov. 26, 2018; U.S. Application No. 62/770,210, field Nov. 21, 2018; U.S. Application No. 62/769,883, filed Nov. 20, 2018; U.S. Application No. 62/756,528, filed Nov. 6, 2018; U.S. Application No. 62/756,542, filed Nov. 6, 2018; U.S. Application No. 62/755,626, filed Nov. 5, 2018; U.S. Application No. 62/755,630, filed Nov. 5, 2018; U.S. Application No. 62/754,929, filed Nov. 2, 2018; U.S. Application No. 62/753,583, filed Oct. 31, 2018; U.S. Application No. 62/752,739, filed Oct. 30, 2018; U.S. Application No. 62/739,904, filed Oct. 2, 2018; U.S. Application No. 62/739,907, filed Oct. 2, 2018; U.S. Application No. 62/732,039, filed Sep. 17, 2018; U.S. Application No. 62/732,138, filed Sep. 17, 2018; U.S. Application No. 62/728,251, filed Sep. 7, 2018; U.S. Application No. 62/720,116, filed Aug. 21, 2018; U.S. Application No. 62/720,113, filed Aug. 20, 2018; U.S. Application No. 62/717,424, filed Aug. 10, 2018; U.S. Application No. 62/711,669, filed Jul. 30, 2018; U.S. Application No. 62/703,909, filed Jul. 27, 2018; U.S. Application No. 62/703,911, filed Jul. 27, 2018; U.S. Application No. 62/700,621, filed Jul. 19, 2018; U.S. Application No. 62/700,632, filed Jul. 19, 2018; and U.S. Application No. 62/694,222, filed Jul. 5, 2018.

U.S. application Ser. No. 16/521,527 is also a continuation-in-part of U.S. application Ser. No. 16/008,707, filed Jun. 14, 2018, which is a continuation-in-part of U.S. application Ser. No. 15/994,595, filed May 31, 2018, which in turn claims priority from U.S. Application No. 62/648,371, filed Mar. 26, 2018; U.S. Application No. 62/638,789, filed Mar. 5, 2018; U.S. Application No. 62/626,660, filed Feb. 5, 2018; U.S. Application No. 62/624,201, filed Jan. 31, 2018; U.S. Application No. 62/619,752, filed Jan. 20, 2018; U.S. Application No. 62/613,313, filed Jan. 3, 2018; U.S. Application No. 62/607,582, filed Dec. 19, 2017; U.S. Application No. 62/546,473, filed Aug. 16, 2017; U.S. Application No. 62/542,168, filed Aug. 7, 2017; U.S. Application No. 62/530,638, filed Jul. 10, 2017; U.S. Application No. 62/522,866, filed Jun. 21, 2017; and U.S. Application No. 62/513,828, filed Jun. 1, 2017.

BACKGROUND OF THE INVENTION

Field of the Invention

The invention relates to an augmented reality ("AR") and/or mixed reality ("MR") system. The present invention is directed to, in embodiments, a sparsely populated see-through near eye display that can be aligned with micro-lenses of a micro-lens array allowing the eye of the user to see the real world, and thus a real image. The present invention is directed to a see-through near eye display, which can be modulated in such a manner to synchronize with electronic enabled micro-lenses of a switchable micro-lens array, wherein when pixels of the near eye display are lit the micro-lenses of the micro-lens array are present; thus, a virtual image can be formed and seen by the eye of a user. In aspects, when the see-through near eye display is not lit, the micro-lenses are not present thus permitting a real image to be present.

Description of Related Art

The use of a see-through near eye display used in association with an aligned micro-lens array has been attempted in the past. The challenge to making such a system work has been that light rays from far (real world) which produce the real image, as seen by the eye of a user, will in many cases enter a plurality of micro-lenses of the micro-lens array and become defocused or aberrated. Therefore, even if the micro-lens array properly produces a clear virtual image, as seen by the eye of a user, the same micro-lens array can cause the real image to be out of focus and thus not sharp resulting in a poor AR/MR experience. Thus, there is a need to permit light rays from the real world that pass through the near eye display to also pass through the micro-lens array without becoming defocused, distorted or aberrated.

SUMMARY

According to embodiments of the invention, the invention is an augmented or mixed reality system comprising a see-through near eye display, which can be modulated in such a manner to synchronize with electronic enabled micro-lenses of a switchable micro-lens array, wherein when pixels of the near eye display are lit the micro-lenses of the micro-lens array are present and/or seen by the user. When the see-through near eye display is not lit, the micro-lenses are not present and/or not seen, and this state allows a real image to be seen by the user.

BRIEF DESCRIPTION OF THE DRAWINGS

The accompanying drawings illustrate certain aspects of embodiments of the present invention and should not be used to limit the invention. Together with the written description the drawings explain certain principles of the invention.

DETAILED DESCRIPTION

Figure 1:
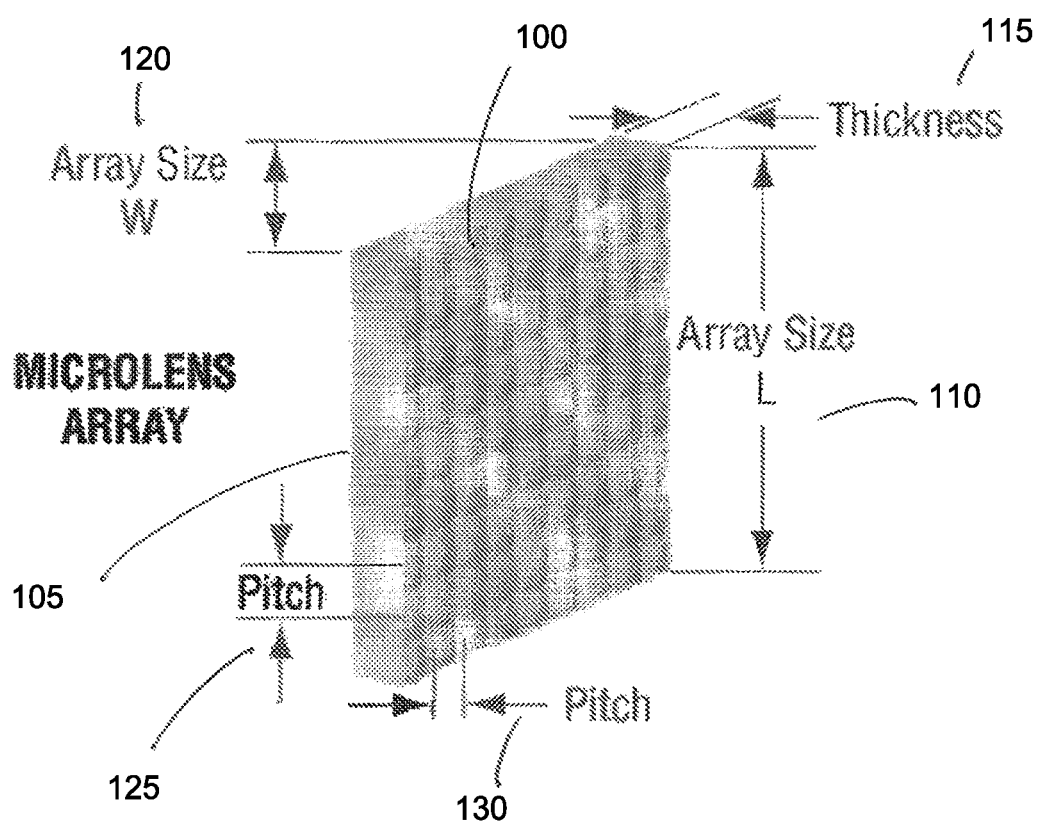
FIG. 1 is a schematic diagram showing a micro-lens array according to an embodiment.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

In certain embodiments, a sparsely populated see-through near eye display can be aligned with micro-lenses of a micro-lens array (see, e.g., FIG. 1) allowing the eye of the user to see the real world, thus a real image. This is accomplished by the eye of the wearer seeing light rays that travel between the pixels of the near eye display and between the micro-lenses of the micro-lens array. However, in certain circumstances, an amount of stray light will penetrate one or more micro-lenses of the micro-lens array. This will likely cause a loss of clarity and contrast of the AR image. When utilizing the invention herein, the see-through near eye display can be modulated in such a manner to synchronize with electronic enabled micro-lenses of a switchable micro-lens array, thus when pixels of the near eye display are lit the micro-lenses of the micro-lens array are present; thus a virtual image can be formed and seen by the eye of a user. When the see-through near eye display is not lit, the micro-lenses are not present, seen, or perceived, thus permitting a real image to be present. Given a faster modulation of both the pixels of the see-through near eye display and the micro-lenses of the micro-lens array (faster than that of when the eye of the user can distinguish an independent virtual image and an independent real image) the eye of the wearer/user will see augmented or mixed reality. Meaning, the eye of the wearer/user will see (or perceive) the real image become blended or combined with the virtual image.

The micro-lens array ("MLA") can be comprised of, by way of example only, one or more of, an optic that is: plano-convex, bi-convex, convex, concave, aspheric, achromatic, diffractive, refractive, Fresnel lens, Gabor Super Lens, GIN Lens, prism, patterned electrode, electro-active lenslet, electro-active lens, electro-active optic, and/or liquid lens (electro wetting and/or mechanical). Such a micro-lens array can be made of, by way of example only, a plastic material, glass material, or a combination of both.

The electronic switchable micro-lens array can comprise, by way of example only, liquid crystal enabled waveplate lenses, liquid crystal enabled refractive lenses or optics, liquid crystal enabled diffractive lenses or optics, liquid crystal enabled Fresnel lenses, a bluephase liquid crystal enabled micro-lens array, a polymer dispersed liquid crystal micro-lens array, mechanically enabled liquid lenses, piezo enabled liquid lenses, and/or patterned electrodes mimicking a lens or optic.

A switchable micro-lens array can be designed so that when its optical power is turned on (meaning it is present or electrified in any manner) it alters light rays projected from the near eye display to cause a virtual image to be seen by the eye of a user; and, when the switchable micro-lens array has its optical power turned off, it allows light rays from the real world to pass through the micro-lens array completely or partially undistorted or unaltered, thereby forming a real image as seen or perceived by the eye of a user. (See, e.g., FIGS. 2 and 3.) In aspects, the micro-lens array comprises a plurality of micro-lenses or micro-lenslets. The micro-lenses that make up said micro-lens array may be comprised of one or more of the group of: plano-convex, bi-convex, convex, concave, aspheric, achromatic, diffractive, refractive, Fresnel lens, Gabor Super Lens, GIN Lens, prism, patterned electrode, electro-active lenslet, electro-active lens, electro-active optic, or liquid lens (electro wetting and/or mechanical). The electronic switchable micro-lens array is comprised of one or more of the group of, by way of example only, liquid crystal enabled waveplate lenses, liquid crystal enabled refractive lenses or optics, liquid crystal enabled diffractive lenses or optics, liquid crystal enabled Fresnel lenses, a blue phase liquid crystal enabled micro-lens array, a polymer dispersed liquid crystal, mechanically enabled liquid lenses, piezo enabled liquid lenses, and/or patterned electrodes mimicking a lens or optic. The micro-lens array can be comprised of a plastic material. The micro-lens array can be comprised of a glass material. The micro-lens array can be comprised of a mixture of glass and plastic. The micro-lens array can be comprised of see-through, transparent, semi-transparent, reflective, semi-reflective, transmissive, partially transmissive, opaque, semi-opaque, and/or translucent material.

FIG. 1 shows a micro-lens array. In this configuration, a series of micro-lenses 100 are placed in an array 105 with a length 110 and a width 120. The micro-lens array has a characteristic thickness 115, and the number of micro-lenses in the array is defined by the vertical pitch 125 and horizontal pitch 130 of the micro-lenses.

Figure 2:
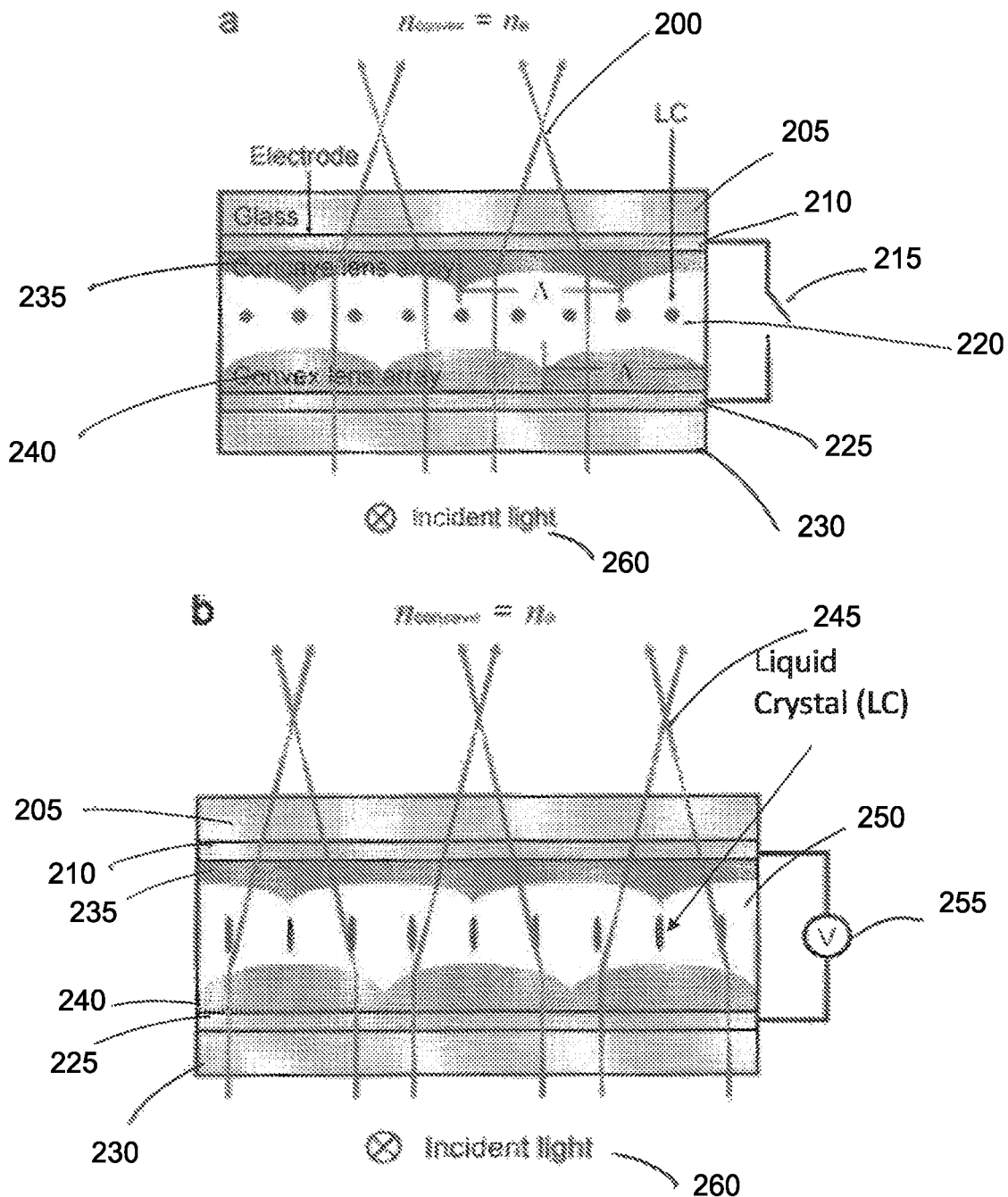
FIG. 2 is a schematic diagram showing a switchable micro-lens array according to an embodiment.

FIG. 2 shows a dithered liquid crystal (LC) switchable micro-lens array. Incident light 260 is linearly polarized perpendicular to the flat plane of the figure as indicated by the X within the circle. The dithered LC switchable micro-lens array includes a liquid crystal material 220 between a concave lens array 235 and a convex lens array 240. The lens arrays are between electrodes 210 and 225 and transparent substrates 205 and 230. The liquid crystal 220 has a planar alignment, i.e., it is aligned parallel to the substrates 205 and 230 when no voltage is applied across the electrodes 210 and 225 (indicated by the open circuit in the top half of FIG. 2).

The concave lens array 235 and convex lens arrays 240 are offset laterally, so the concave lens array 235 focuses light to a one set of focal points 200 and the convex lens arrays 240 focuses light to another set of focal points 245. The index of refraction of the concave lenslet array 235 is matched to the ordinary refractive index of the liquid crystal 220 ($n_{concave} = n_o$) and the index of refraction of the convex lenslet array 240 is matched to the extraordinary refractive index of the liquid crystal 220 ($n_{convex} = n_e$).

The top half of FIG. 2 illustrate operation of the dithered LC switchable micro-lens array when there is no voltage applied (open circuit 215) to the liquid crystal 220. For the linearly polarized incident light 260, the polarization is parallel to the optical axis of the liquid crystal 220, so the liquid crystal 220 is index-matched to the convex lens array 235. As a result, the convex surfaces of the convex lens array 235 do not refract the incident light 260 due to the index matching as shown by the vertical lines (light rays) extending from the convex lens array 235 into the liquid crystal material 220. However, there is a mismatch in refractive index between the concave lens array 240 and the liquid crystal 220, with the concave lens array 240 possessing a lower refractive index than the liquid crystal 220 as illustrated by the direction of refraction (bend angle of the light rays at the concave surface). Therefore, the concave lens array 235 focuses the incident light 260 to the corresponding foci 200.

The bottom half of FIG. 2 illustrate operation of the dithered LC switchable micro-lens array when a voltage 255 is applied to the electrodes 210 and 240, rotating the liquid crystal (now indicated by 250). In this state, the optical axis of the liquid crystal 250 is perpendicular to the substrates 205 and 230. Linearly polarized light 260 entering the dithered LC switchable micro-lens array experiences the ordinary refractive index of the liquid crystal 250, which is now matched to the refractive index of the concave lens array 235 instead of to the refractive index of the convex lens array 240. As a result, the convex lens array 240 focuses the light to foci 245 instead of to foci 200.

Figure 3:
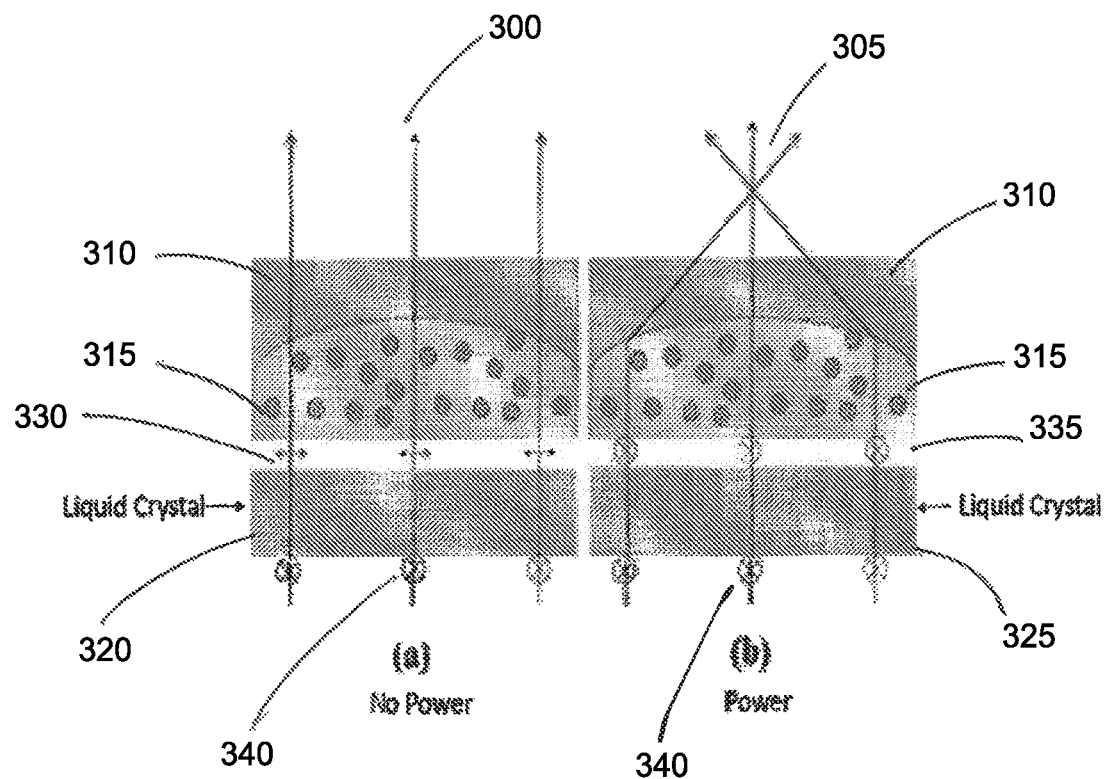
FIG. 3 is a schematic diagram showing a switchable micro-lens array according to an embodiment, wherein an embodiment is shown with power and without power.

FIG. 3 shows a liquid crystal switchable micro-lens array that operates on incident light 340 that is linearly polarized perpendicular to the plane of the figure per the X within the circle. The liquid crystal switchable micro-lens array includes a birefringent convex lens 315 between a liquid crystal and another medium 310.

At left, the liquid crystal is in a first (unpowered) state 320 and rotates the polarization of the incident light by 90 degrees so that the polarization is aligned with the ordinary axis of the birefringent convex lens 315. The ordinary refractive index of the birefringent convex lens 315 is index-matched to the refractive index of the medium 310, so the light 360 does not refract at the convex surface of the birefringent convex lens 315 as indicated by the parallel rays 300.

At right, the liquid crystal is in a second (powered) state 325 and does not rotate the polarization of the incident light 360. As a result, the polarization is aligned with the extraordinary axis of the birefringent convex lens 315. The extraordinary refractive index of the birefringent convex lens 315 is greater than the refractive index of the medium 310, so the light 360 refracts at the convex surface of the birefringent convex lens 315 as indicated by the rays converging at a focus 305.

Examples

In one embodiment, an augmented reality or mixed reality system comprises an electronic switchable micro-lens array. The modulation of the electronically switchable micro-lens array can cause the virtual image to appear and disappear while the real image is always present, whether it is seen, not seen, perceived, or not perceived. This occurs due to the electronic switchable micro-lens array being turned on and off (its duty cycle, in aspects). In aspects, the modulation can be at a speed completely or partially faster than the brain can interpret the real image and the virtual image being individual images, thus causing the brain of the user to sum or combine the real image and the virtual image permitting the eye (and/or brain) of the user to see AR or MR. In such an embodiment, an electronic switchable micro-lens array turns its optical power on to alter light rays projected from a see-through near eye display, thereby causing a virtual image to be seen by the eye of a user. The switchable MLA turns its optical power off for allowing the light rays from the real world to pass through the micro-lens array partially or completely undistorted or unaltered, thereby forming a real image as seen by the eye of a user (and/or perceived by a brain of the user). In this particular embodiment, whether the micro-lenses are turned on or off, there is a real image being seen by the eye of a user. This occurs due to the spacing of the micro-lenses from one another and the spacing of the pixels of the see-through near eye display from one another.

In a second embodiment, both the micro-lens array and the micro-display are modulated synchronously. The pixels of the micro-display and the micro-lens array are populated in a dense manner, causing the fill factors to be high. In this embodiment, the real image is distorted by the micro-lens array, when the lenses are switched on. The real image therefore appears only when the micro-display and the micro-lens array are both switched off. The modulation of the electronically switchable micro-lens array will cause the virtual image to appear and disappear while the real image is modulated on and off (its duty cycle) at the same time as the virtual image. In this embodiment, the real image is only seen when the virtual image is not present. This occurs due to both the electronic switchable micro-lens array being turned on and off (its duty cycle) at the same time. The modulation can be at a speed faster than the brain can interpret the real image and the virtual image as being individual images, thus causing the brain of the user to sum or combine the real image and the virtual image permitting the eye of the user to see AR or MR In such an embodiment, a switchable micro-lens array can turn the optical power of the micro-lenses of the micro-lens array that are aligned with pixels of such a see-through near eye display on to alter light rays projected from the see-through near eye display to cause a virtual image to be seen by the eye of a user (or perceived), and can turn optical power off for allowing the light rays from the real world to pass through the micro-lens array partially or completely undistorted or unaltered for forming a real image as seen by the eye of a user (or perceived).

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. An augmented reality system comprising:
   a near-eye display; and
   a switchable micro-lens array aligned with the near-eye display, the switchable micro-lens array comprising:
      a first lens array having a first refractive index;
      a second lens array having a second refractive index;
      a liquid crystal layer between the first lens array and the second lens array and switchable between the first refractive index and the second refractive index,
   wherein the near-eye display is configured to be modulated in synchronization with modulation of the switchable micro-lens array,
   wherein when an optical power of the switchable micro-lens array is at a first level, the switchable micro-lens array alters light rays projected from pixels of the near-eye display allowing a virtual image to be seen by an eye of a user,
   wherein when the optical power of the switchable micro-lens array is at a second level different than the first level, the switchable micro-lens array allows light rays from a real-world environment to pass through the switchable micro-lens array without a change in focus to form a real image as seen by the eye of the user.

2. The augmented reality system of claim 1, wherein the near-eye display is a sparse near-eye display.

3. The augmented reality system of claim 1, wherein the near-eye display is a see-through near-eye display.

4. The augmented reality system of claim 1, wherein the near-eye display comprises pixels spaced apart to allow the light rays from the real-world environment to pass through the near-eye display at least partially undistorted.

5. The augmented reality system of claim 1, wherein the first lens array is a convex lens array and the second lens array is a concave lens array.

6. The augmented reality system of claim 1, wherein the first lens array is aligned to focus incident light to a first set of focal points and the second lens array is aligned to focus incident light to a second set of focal points different than the first set of focal points.

7. The augmented reality system of claim 6, wherein the first lens array is laterally offset from the second lens array and the first set of focal points is laterally offset from the second set of focal points.

8. The augmented reality system of claim 1, wherein the near-eye display and the switchable micro-lens array are configured to be switched on and off in synchronization at a rate fast enough that the user perceives a combination of the virtual image and the real image.

9. The augmented reality system of claim 1, wherein the switchable micro-lens array is configured to be switched on and off at a rate fast enough that the user perceives a combination of the virtual image and the real image.

* * * * *